US008494141B2

(12) United States Patent
Jenkins et al.

(10) Patent No.: US 8,494,141 B2
(45) Date of Patent: Jul. 23, 2013

(54) RULES-BASED TELECONFERENCING

(75) Inventors: Jana H. Jenkins, Raleigh, NC (US); Lloyd W. Allen, Jr., Cary, NC (US); Steven M. Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 12/360,237

(22) Filed: Jan. 27, 2009

(65) Prior Publication Data
US 2010/0189242 A1  Jul. 29, 2010

(51) Int. Cl.
*H04M 3/56* (2006.01)

(52) U.S. Cl.
USPC ..................................... 379/202.01; 379/158

(58) Field of Classification Search
USPC .................... 379/202.01, 158, 203.01, 204.01
See application file for complete search history.

(56) References Cited

U.S. PATENT DOCUMENTS

| | | | |
|---|---|---|---|
| 5,012,509 A | 4/1991 | Nakamura et al. | |
| 5,483,588 A | 1/1996 | Eaton et al. | |
| 5,774,867 A * | 6/1998 | Fitzpatrick et al. | 705/7.19 |
| 5,822,525 A | 10/1998 | Tafoya et al. | |
| 5,835,236 A | 11/1998 | Barbari | |
| 6,163,692 A * | 12/2000 | Chakrabarti et al. | 455/416 |
| 6,404,873 B1 | 6/2002 | Beyda et al. | |
| 6,417,933 B1 | 7/2002 | Szurkowski | |
| 6,573,926 B1 | 6/2003 | Ichimura | |
| 6,731,732 B2 * | 5/2004 | Creamer et al. | 379/201.03 |
| 6,760,423 B1 * | 7/2004 | Todd | 379/202.01 |
| 6,816,468 B1 | 11/2004 | Cruickshank | |
| 6,940,960 B2 | 9/2005 | Benco et al. | |
| 6,966,000 B2 | 11/2005 | Zhang et al. | |
| 7,054,918 B2 * | 5/2006 | Polcyn | 709/217 |
| 7,107,317 B2 | 9/2006 | Demsky et al. | |
| 7,277,697 B2 * | 10/2007 | Desai et al. | 455/416 |
| 7,343,008 B1 | 3/2008 | Frankel | |
| 7,421,401 B2 * | 9/2008 | Demsky et al. | 705/7.19 |
| 7,567,662 B1 * | 7/2009 | Renner et al. | 379/202.01 |
| 7,587,037 B2 | 9/2009 | White | |
| 7,602,893 B2 * | 10/2009 | Bhatia et al. | 379/202.01 |
| 7,889,851 B2 * | 2/2011 | Shah et al. | 379/202.01 |
| 2001/0014866 A1 * | 8/2001 | Conmy et al. | 705/9 |
| 2002/0093673 A1 | 7/2002 | Safra et al. | |
| 2002/0131565 A1 * | 9/2002 | Scheuring et al. | 379/88.19 |
| 2002/0163572 A1 * | 11/2002 | Center et al. | 348/14.08 |
| 2003/0074326 A1 | 4/2003 | Byers | |
| 2003/0081243 A1 | 5/2003 | Su | |
| 2003/0109289 A1 | 6/2003 | Ito | |
| 2003/0158900 A1 | 8/2003 | Santos | |
| 2004/0032485 A1 | 2/2004 | Stephens, Jr. | |
| 2004/0047461 A1 | 3/2004 | Weisman et al. | |

(Continued)

*Primary Examiner* — William Deane, Jr.
(74) *Attorney, Agent, or Firm* — Moore & Van Allen PLLC (57) ABSTRACT

Rules-based teleconferencing that may include receiving criteria regarding invitees to a teleconference call, generating rules based on the criteria, and generating a notification regarding the invitees to the teleconference call based on the rules. The criteria may include a quorum of a minimum number of invitees that must be in attendance at the teleconference call or a list of specific invitees required to be in attendance at the teleconference call. A processing device may include a network interface, one or more second interfaces configured to establish a connection between at least three telephones, and a controller configured to establish a teleconference call between the at least three telephones, receive criteria regarding invitees to the teleconference call, generate rules based on the criteria, and generate a notification regarding the invitees to the teleconference call based on the rules.

21 Claims, 6 Drawing Sheets

U.S. PATENT DOCUMENTS

| | | |
|---|---|---|
| 2004/0064355 A1* | 4/2004 | Dorenbosch et al. ............. 705/9 |
| 2004/0099731 A1 | 5/2004 | Olenick et al. |
| 2004/0141005 A1 | 7/2004 | Banatwala et al. |
| 2004/0141605 A1 | 7/2004 | Chen et al. |
| 2005/0044503 A1* | 2/2005 | Richardson et al. .......... 715/753 |
| 2005/0152523 A1 | 7/2005 | Fellenstein et al. |
| 2005/0227677 A1 | 10/2005 | Kallio |
| 2005/0273866 A1 | 12/2005 | Brown et al. |
| 2005/0278423 A1 | 12/2005 | White |
| 2005/0278424 A1 | 12/2005 | White |
| 2006/0045029 A1 | 3/2006 | Ethier et al. |
| 2006/0200555 A1 | 9/2006 | Shannon et al. |
| 2006/0212704 A1 | 9/2006 | Kirovski et al. |
| 2007/0005691 A1 | 1/2007 | Pushparaj |
| 2007/0047715 A1 | 3/2007 | Madhusudan et al. |
| 2007/0127669 A1 | 6/2007 | Shields |
| 2007/0185956 A1 | 8/2007 | Ogle et al. |
| 2007/0206759 A1 | 9/2007 | Boyanovsky |
| 2007/0206760 A1* | 9/2007 | Bandhole et al. ........ 379/202.01 |
| 2007/0285504 A1* | 12/2007 | Hesse ........................ 348/14.08 |
| 2008/0084984 A1* | 4/2008 | Levy et al. ............... 379/202.01 |
| 2008/0137831 A1 | 6/2008 | Khorsandi |
| 2008/0159503 A1 | 7/2008 | Helbling et al. |
| 2008/0184267 A1 | 7/2008 | Hochmuth |
| 2008/0186164 A1* | 8/2008 | Emigh et al. ............. 340/539.13 |
| 2008/0219426 A1 | 9/2008 | Lai |
| 2009/0005038 A1 | 1/2009 | Yasrebi et al. |
| 2009/0006608 A1 | 1/2009 | Gupta et al. |
| 2009/0013045 A1 | 1/2009 | Maes et al. |
| 2009/0028395 A1 | 1/2009 | Riionheimo |
| 2009/0083380 A1 | 3/2009 | Smyth et al. |
| 2009/0123035 A1* | 5/2009 | Khouri et al. ................. 382/115 |
| 2009/0319319 A1* | 12/2009 | Oral et al. ......................... 705/8 |
| 2009/0323916 A1 | 12/2009 | O'Sullivan et al. |
| 2010/0061538 A1 | 3/2010 | Coleman et al. |
| 2010/0070640 A1 | 3/2010 | Allen, Jr. et al. |
| 2010/0076802 A1* | 3/2010 | Bhogal et al. ..................... 705/8 |
| 2010/0121666 A1* | 5/2010 | Niazi ................................ 705/8 |
| 2010/0165889 A1 | 7/2010 | Madabhushi et al. |
| 2010/0180211 A1* | 7/2010 | Boyd .......................... 715/751 |
| 2010/0189239 A1 | 7/2010 | Miller et al. |
| 2010/0189240 A1 | 7/2010 | Miller et al. |
| 2010/0189241 A1 | 7/2010 | Miller et al. |
| 2010/0189243 A1 | 7/2010 | Miller et al. |
| 2011/0093548 A1* | 4/2011 | Das et al. ...................... 709/206 |

* cited by examiner

RULES-BASED TELECONFERENCING

The present application is related to the following applications that each have the same inventors and assignee: "Contacting A Person Outside of a Teleconference Without Leaving the Teleconference", application Ser. No. 12/360,189; "Accessing Details of Teleconference Call Invitees", application Ser. No. 12/360,173; "Providing Multilevel Conference Call Participants", application Ser. No. 12/360,212; "Enhanced Announcement of Conference Call Participants", application Ser. No. 12/360,251.

BACKGROUND OF THE INVENTION

The present invention is related to teleconferencing, and more specifically to rules-based teleconferencing.

Sometimes when you are preparing for a teleconference call where certain decisions must be made or you need certain expertise, it is very helpful to know when the required decision makers or subject matter experts are on the teleconference call. That way, you know when you can begin the discussion, without having to go back and repeat yourself as these key people join the teleconference call. Depending on the number of invitees, it can become cumbersome for the meeting chair to know when these key attendees have joined as they make small talk or answer questions posed by attendees who have already joined. Other times, you just need a quorum or majority of invitees to join the teleconference call so that the meeting can proceed. Sometimes, you might need a combination of both.

BRIEF SUMMARY OF THE INVENTION

According to one aspect of the present invention, a method for rules-based teleconferencing that may include receiving criteria regarding invitees to a teleconference call, generating rules based on the criteria, and generating a notification regarding the invitees to the teleconference call based on the rules.

According to another aspect of the present invention, a processing device that may include a network interface, at least one second interface configured to establish a connection between at least three telephones, and a controller configured to establish a teleconference call between the at least three telephones, receive criteria regarding invitees to the teleconference call, generate rules based on the criteria, and generate a notification regarding the invitees to the teleconference call based on the rules.

According to a further aspect of the present invention, a computer program product comprising a computer useable medium having computer useable program code embodied therewith, the computer useable program code comprising computer useable program code configured to receive criteria regarding invitees to a teleconference call, computer useable program code configured to generate rules-based on the criteria, and computer useable program code configured to generate a notification regarding the invitees to the teleconference call based on the rules.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the present invention, a meeting chairperson (or other designated invitee) can indicate before or while setting up a teleconference call meeting how many attendees are invited, identities of the invitees, and whether a quorum of a minimum number of invitees or a specific required attendee(s) list is appropriate or required for the meeting. The meeting chair may be notified automatically when a quorum is reached, or when the specific, required invitees have joined the call. The meeting chair may also be notified automatically when a quorum has not been reached, or when all the specific, required invitees have not joined the call. The automated notification function frees up the chair to focus on the attendees and not whether the meeting can proceed, or whether a particular person has joined the teleconference call yet. If enough invitees cannot make the call, the system can be configured to automatically cancel the meeting and reschedule another meeting, based on rules that were set up for the original meeting.

Moreover, according to embodiments of the present invention, a call system may also provide options to a meeting chair on the teleconference call. The conference call system may directly initiate any (re)scheduling of meetings, eliminating or reducing the need to use an external mail or calendar system by the meeting chair to handle logistics and communication. Interfaces to scheduling and calendar systems for scheduling meetings may be supported and configured by the meeting chair or conference call originator. This functionality may prove helpful when a meeting was not completed during the scheduled time and a follow-on meeting needs to be scheduled.

In embodiments according to the present invention, criteria defined for a particular meeting may be set through a number of interfaces such as, for example, Web applications, voice menus, a scheduling system, a calendar system, etc. A user or meeting originator may set up criteria defining characteristics of the teleconference meeting such as, for example, the number of invitees, the identities of the invites, whether a quorum is desired, identities of specific invitees that are required to be at the meeting, whether just the call chairman or originator is notified when a quorum is reached or all specific invitees have joined the call or whether all invitees are notified, and whether delegates may be accepted to attend a meeting in place of an original invitee. A user may also set up criteria related to whether a teleconference call should be canceled if a quorum is not met or all the specific invitees are not in attendance, whether the teleconference call should be automatically canceled and automatically rescheduled when a quorum is not met or all the specific invitees are not in attendance or the user should be prompted regarding cancellation and rescheduling, whether a user should be prompted to approve an automatically rescheduled teleconference meeting, etc. Once the criteria have been sent to or entered into a call system, the call system may generate rules based on the criteria regarding the teleconference call. These rules may be in the form of policies defined using extensible markup language (XML) or other type methods. The ability to override or alter criteria, requirements and rules may be available to the meeting chairman or designee before and during the scheduled teleconference call time. Meeting chairman may allow alteration to the invitee list such as permitting designee attendees to replace invited parties. Appropriate voice prompts and status messages may be available and used in an embodiment according to the present invention.

Moreover, according to embodiments of the present invention, a call system may receive criteria from a teleconference call originator and access a scheduling system and/or a calendar system (or other appropriate system) of all invitees to automatically schedule a teleconference call, cancel a teleconference call, reschedule a teleconference call and/or notify invitees and the teleconference call originator of status regarding the teleconference call. A call system may access calendar information for each invitee to determine availability and schedule or reschedule a teleconference call meeting based on the availability of all invitees. Further, the call system may automatically access and update each invitee's calendar should a teleconference meeting be canceled or rescheduled. This relieves a meeting chair or teleconference call originator from having to manually perform these tasks.

The following exemplary scenarios are provided to help illustrate some embodiments of the present invention. Scenario 1: John sets up a meeting and requires a quorum for his call to proceed. He has invited 12 invitees and wants at least 7 to be present to begin the discussion. At the time of the meeting, John and his invitees call in at the designated time. When the $7^{th}$ caller is connected, a recorded message states "your quorum has been reached". Now the call originator or everyone on the call knows that there are enough people dialed in to begin the discussion. Scenario 2: Betsy is conducting a meeting where she needs two levels of managers and a high-level technical person on the call to answer any questions and get the funding request approved. She has a number of other interested stakeholders on the call as well. She sets up her meeting and requires a specific required attendee list for the call. She indicates that John Manager, Susan Managertoo, and Bob Knowsit are required for the call to begin. If she has a required number of stakeholders on the call, she could indicate that number as well. When John, Susan, and Bob have joined the call, a recorded message states "All required attendees have joined the call." Betsy knows she can begin the call with the right folks present and accounted for. Scenario 3: Susan sets up a meeting with a required set of attendees. One of the required attendees sends her an IM right before the meeting begins, indicating that an unscheduled conflict has occurred and he cannot make her meeting after all. Susan accesses the call system to indicate that the meeting will be cancelled and requests an automatic reschedule at the earliest time when all the required attendees can meet again. Scenario 4: Michael runs a meeting that is going very well, but is getting ready to run over its scheduled time. He accesses the call system option to automatically reschedule a follow-on meeting with the same attendee list and requirements configured for the original meeting.

Figure 1:
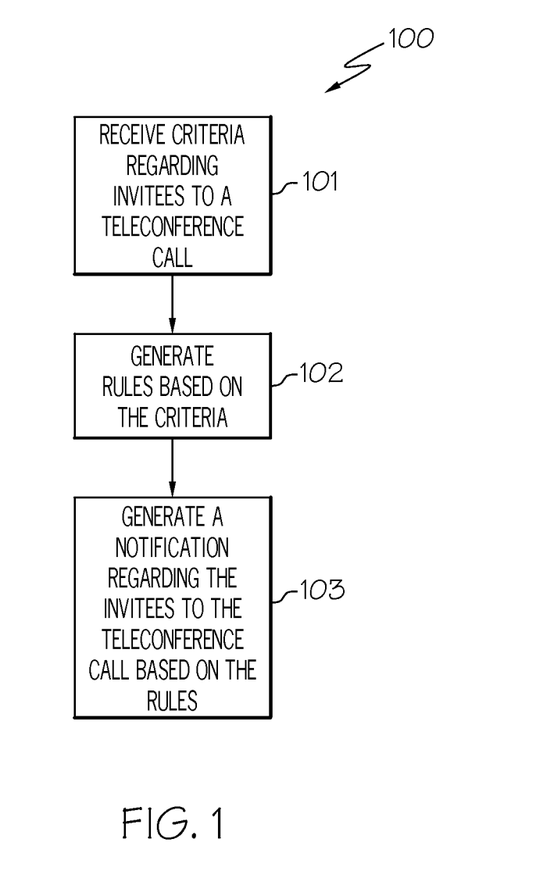
FIG. 1 is a flowchart of a process for rules-based teleconferencing according to an exemplary embodiment of the present invention.

FIG. 1 shows a flowchart of a process for rules-based teleconferencing according to an exemplary embodiment of the present invention. In the process 100, in block 101, criteria regarding invitees to a teleconference call may be received. In block 102, rules may be generated based on the criteria. In block 103, a notification may be generated regarding the invitees to the teleconference call based on the rules.

Figure 2:
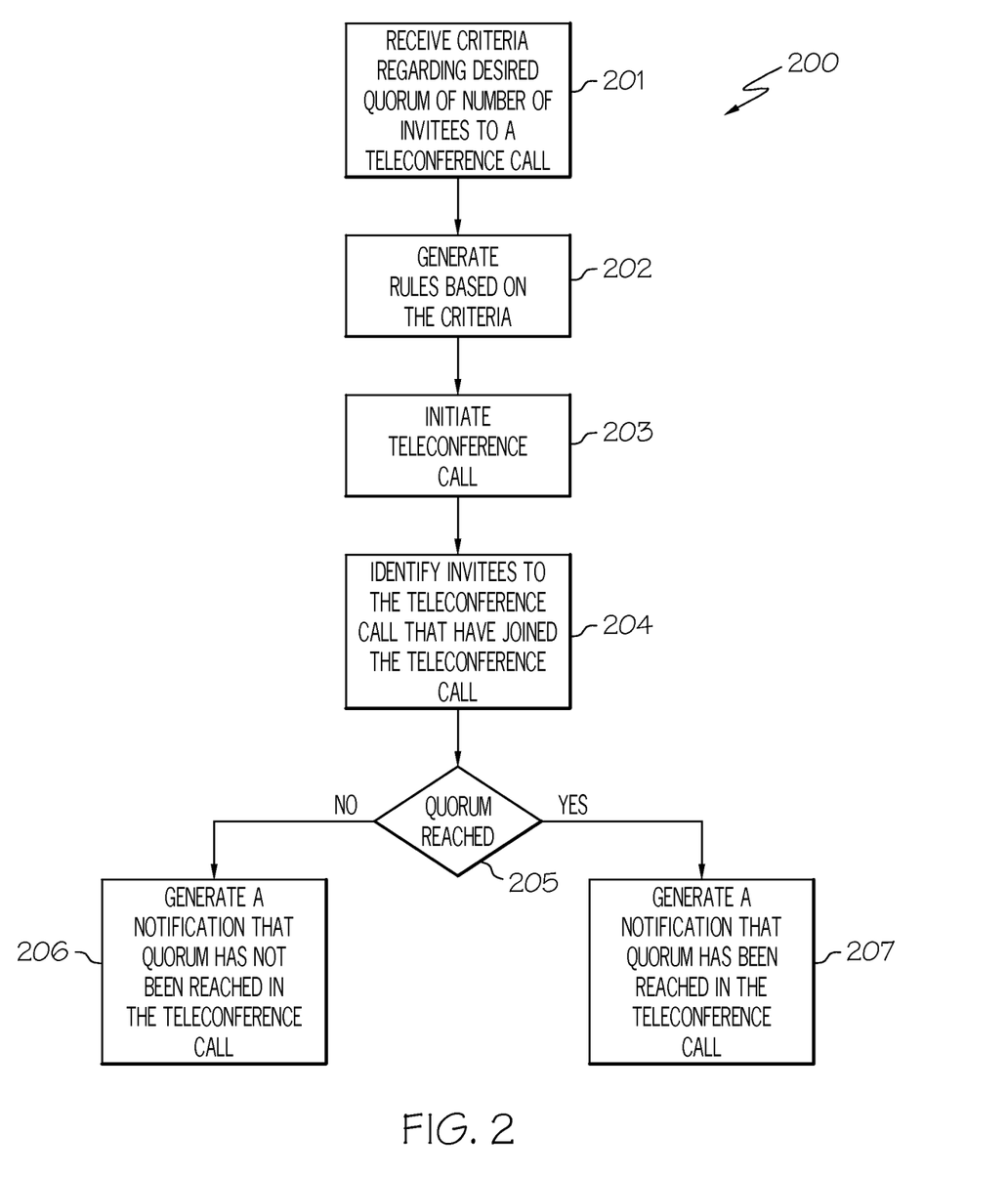
FIG. 2 is a flowchart of a process for rules-based teleconferencing according to another exemplary embodiment of the present invention.

FIG. 2 shows a flowchart of a process for rules-based teleconferencing according to another exemplary embodiment of the present invention. In the process 200, in block 201, criteria may be received regarding a desired quorum of number of invitees to a teleconference call. In block 202, rules may be generated based on the criteria. In block 203, a teleconference call may be initiated. In block 204, invitees to the teleconference call that have joined the teleconference call may be identified. In block 205, it may be determined if a quorum of invitees has joined the teleconference call and if not, in block 206, a notification may be generated during the teleconference call that a quorum has not been reached in the teleconference call. If a quorum has been reached, then in block 207, a notification may be generated in the teleconference call that a quorum has been reached in the teleconference call.

Figure 3:
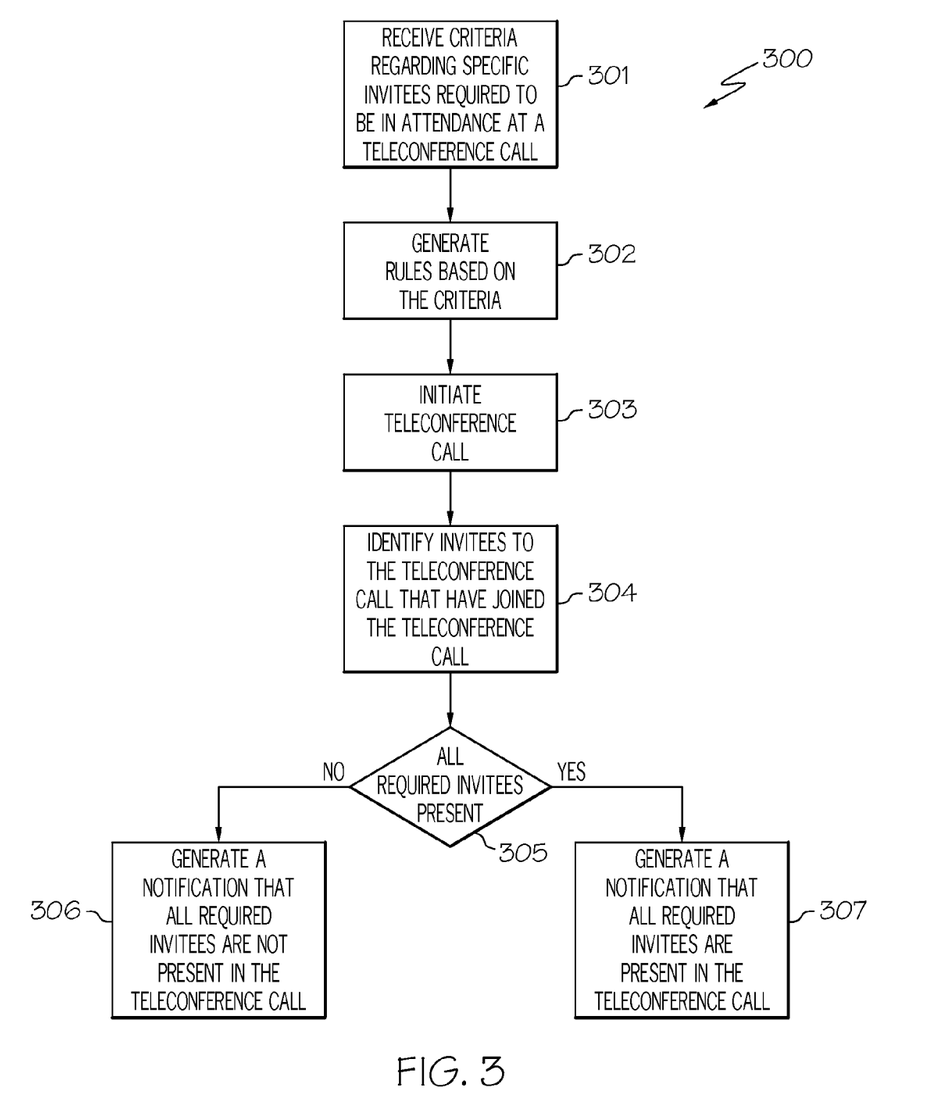
FIG. 3 is a flowchart of a process for rules-based teleconferencing according to a still further exemplary embodiment of the present invention.

FIG. 3 shows a flowchart of a process for rules-based teleconferencing according to a still further exemplary embodiment of the present invention. In the process 300, in block 301, criteria may be received regarding specific invitees required to be in attendance at a teleconference call. In block 302, rules may be generated based on the criteria. In block 303, a teleconference call may be initiated. In block 304, invitees to the teleconference that have joined a teleconference may be identified. In block 305, it may be determined whether all required invitees have joined the teleconference call and if not then in block 306, a notification may be generated in the teleconference call that all required invitees are not present in the teleconference call. If all required invitees have joined the teleconference, then in block 307, a notification may be generated in the teleconference call that all required invitees are present in the teleconference call.

Figure 4:
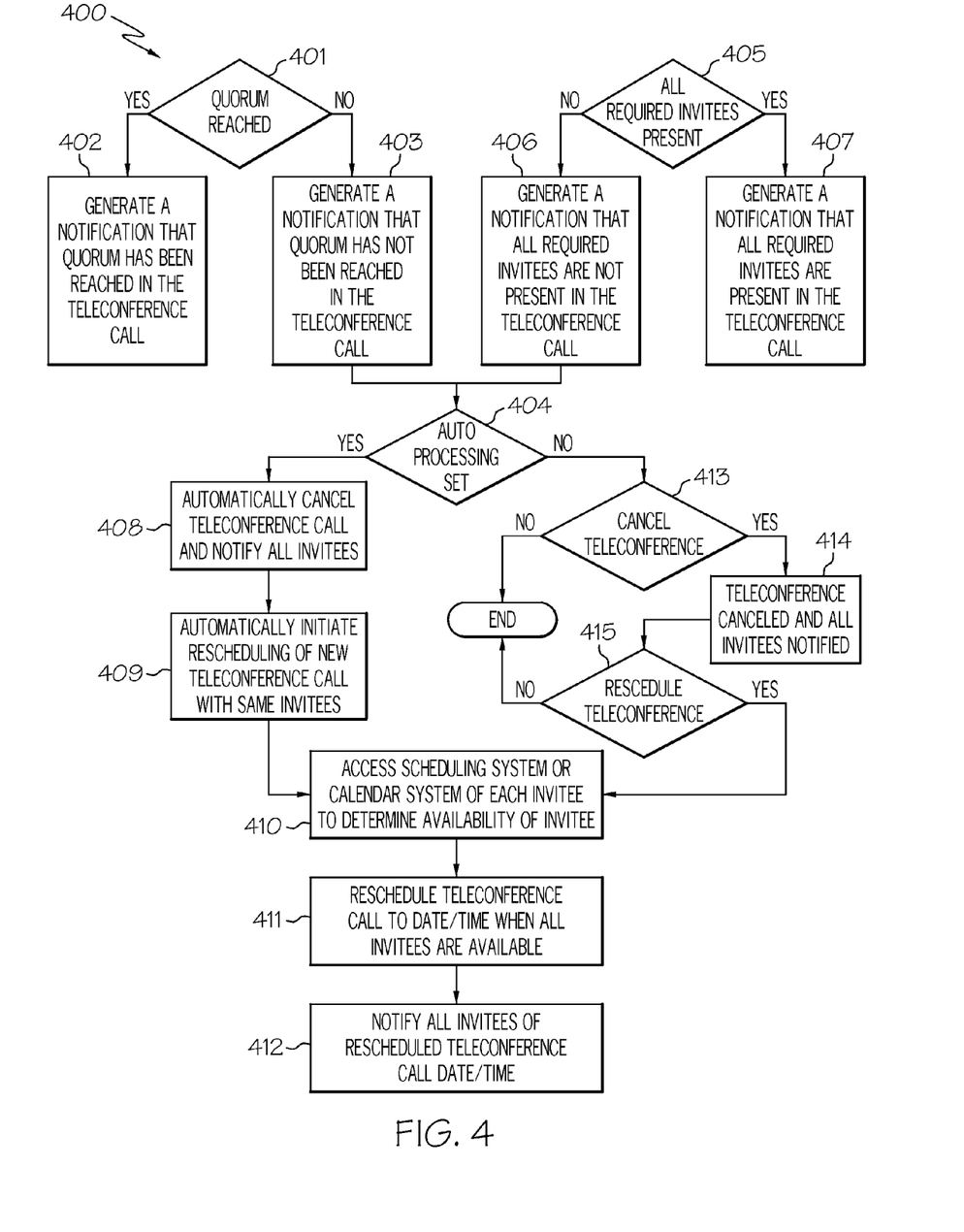
FIG. 4 is a flowchart of a process for rules-based automatic rescheduling of a teleconference according to an exemplary embodiment of the present invention.

FIG. 4 shows a flowchart of a process for rules-based automatic rescheduling of a teleconference according to an exemplary embodiment of the present invention. In the process 400, in block 401, it may be determined if a quorum has been reached in a teleconference call and if so, a notification may be generated in the teleconference call that a quorum has been reached in the teleconference call. If a quorum has not been reached, then in block 403, a notification may be generated in the teleconference call that a quorum has not been reached in the teleconference call. Then in block 404, it may be determined whether automatic processing of the teleconference call has been set up.

Simultaneously, in block 405, it may be determined whether all required invitees are present and have joined the teleconference call and if so, then in block 407, a notification may be generated in the teleconference call that all required invitees have joined and are present in the teleconference call. If all required invitees are not present, then in block 406, a notification may be generated in the teleconference call that all required invitees are not present in the teleconference call and then in block 404, it may be determined whether automatic processing of the teleconference call meeting has been set up.

If automatic processing has been set, then in block 408, the teleconference call may be automatically cancelled and all invitees may be notified of the cancellation. Then in block 409, rescheduling of a new teleconference call with the same invitees may be automatically initiated. In block 410, a scheduling system or calendar system of each invitee may be accessed to determine the availability of each invitee or the rescheduled teleconference call. In block 411, the teleconference call may be rescheduled to a date/time when all invitees are available and then in block 412, all invitees may be automatically notified of the rescheduled teleconference call date/time.

If automatic processing has not been set, then in block 413, it may be determined whether to cancel the current teleconference call. This may occur via sending a message or prompt to a chair or initiator of the teleconference call requesting their decision, or the chair or initiator of the teleconference call may cancel the teleconference call by making a selection or sending a message to a call system. If it is determined not to cancel the teleconference call, then the process ends. If it is determined to cancel the teleconference call then in block 414, the teleconference call may be canceled and all invitees notified of the cancellation. In block 415, it may be determined whether it is desired to reschedule the teleconference call and if not, the process ends. Again, a chair or initiator of the teleconference call may be sent a message or prompted to make a decision regarding rescheduling, or the initiator or chair of the teleconference call may send a message or make a selection with their decision regarding rescheduling the teleconference call. If it is determined to reschedule the teleconference call, then in block 410, a scheduling system or calendar system of each invitee may be accessed to determine the availability of each invitee or the rescheduled teleconference call. In block 411, the teleconference call may be rescheduled to a date/time when all invitees are available and then in block 412, all invitees may be automatically notified of the rescheduled teleconference call date/time.

Figure 5:
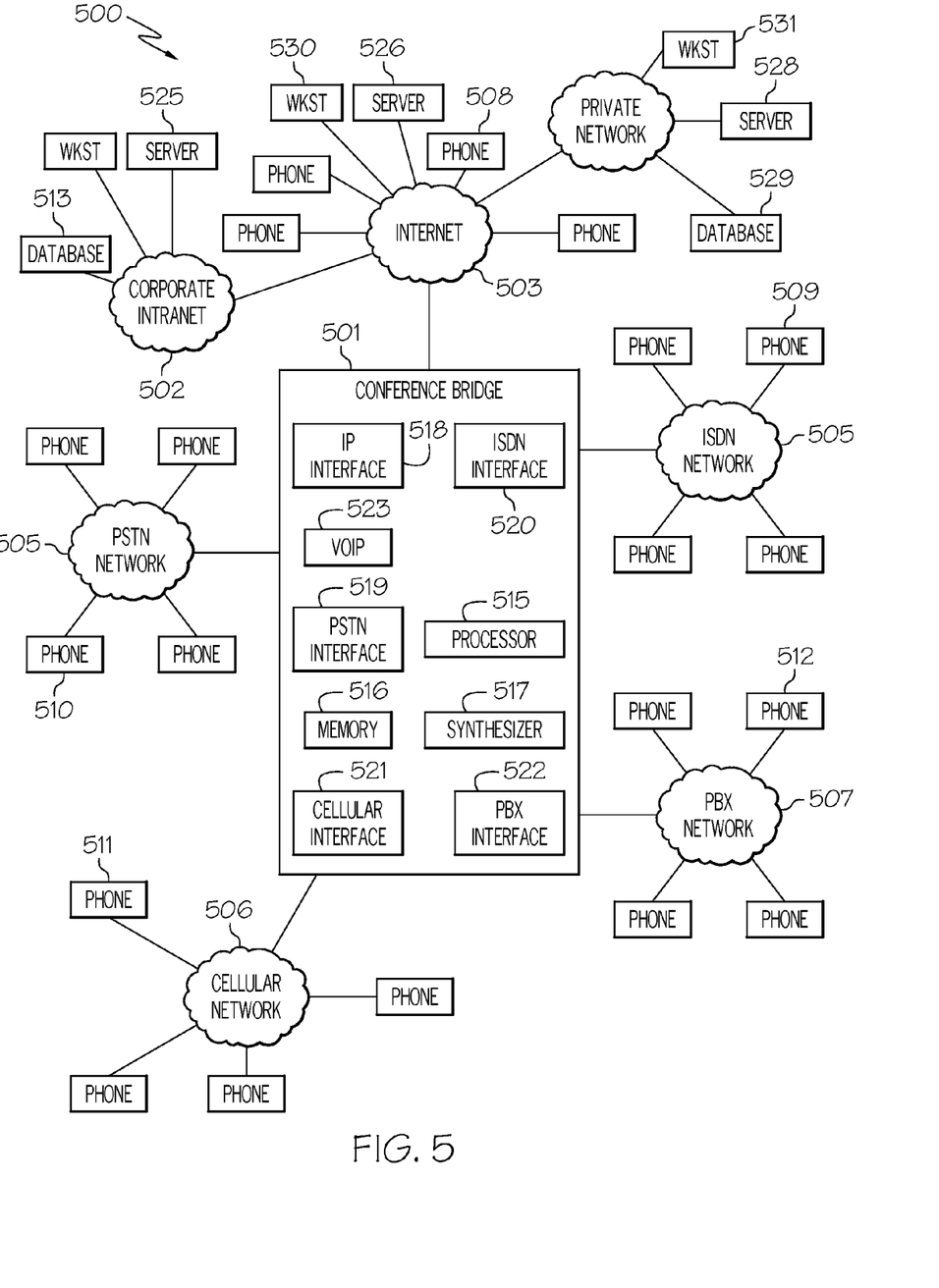
FIG. 5 is a diagram of a system for rules-based teleconferencing according to an exemplary embodiment of the present invention.

FIG. 5 shows a diagram of a system for rules-based teleconferencing according to an exemplary embodiment of the present invention. The system 500 may include a processing device 501 that may be interconnected to one or more networks or other resources. The processing device 501 may be a call system, a conference bridge, or any similar type device. To illustrate embodiments of the present invention the processing device 501 will be referred to as a call system. The call system 501 may be interconnected to the Internet 503 that may be interconnected to one or more telephones 508, a corporate Intranet 502 that may have access to a database 513 and a server 525, a public switched telephone network (PSTN) 504 that may be connected to one or more telephones 510, a cellular network 506 that may be interconnected to one or more telephones 511, a Private Branch Exchange (PBX) network 507 that may be interconnected to one or more telephones 512, an Integrated Services Digital Network (ISDN) 505 that may be interconnected to one or more telephones 509, etc. The Internet 503 may also allow connection to one or more servers 526, one or more workstations 530, and a private network 527 that may be connected to one or more servers 528, one or more workstations 531, and a database 529. The call system 501 may include an Internet Protocol (IP) interface 518, voice over IP (VOIP) processing 523, a PSTN interface 519, an ISDN interface 520, a cellular interface 521, a PBX interface 522, a synthesizer 517, memory 516, and a controller or processor 515 that controls processing and all of the interfaces.

The call system 501 may setup a teleconference call with one or more telephones from any of the networks 502-507. Further, the call system 501 may initiate a teleconference call between telephones, receive criteria regarding invitees to the teleconference call, generate rules based on the criteria, and generate a notification regarding the invitees to the teleconference call based on the rules. The notification may be generated in the teleconference call to one or more invitees that have joined the teleconference call. The criteria may include a quorum of a minimum number of invitees that must be in attendance at the teleconference call. The criteria may also include a list of specific invitees required to be in attendance at the teleconference call.

Figure 6:
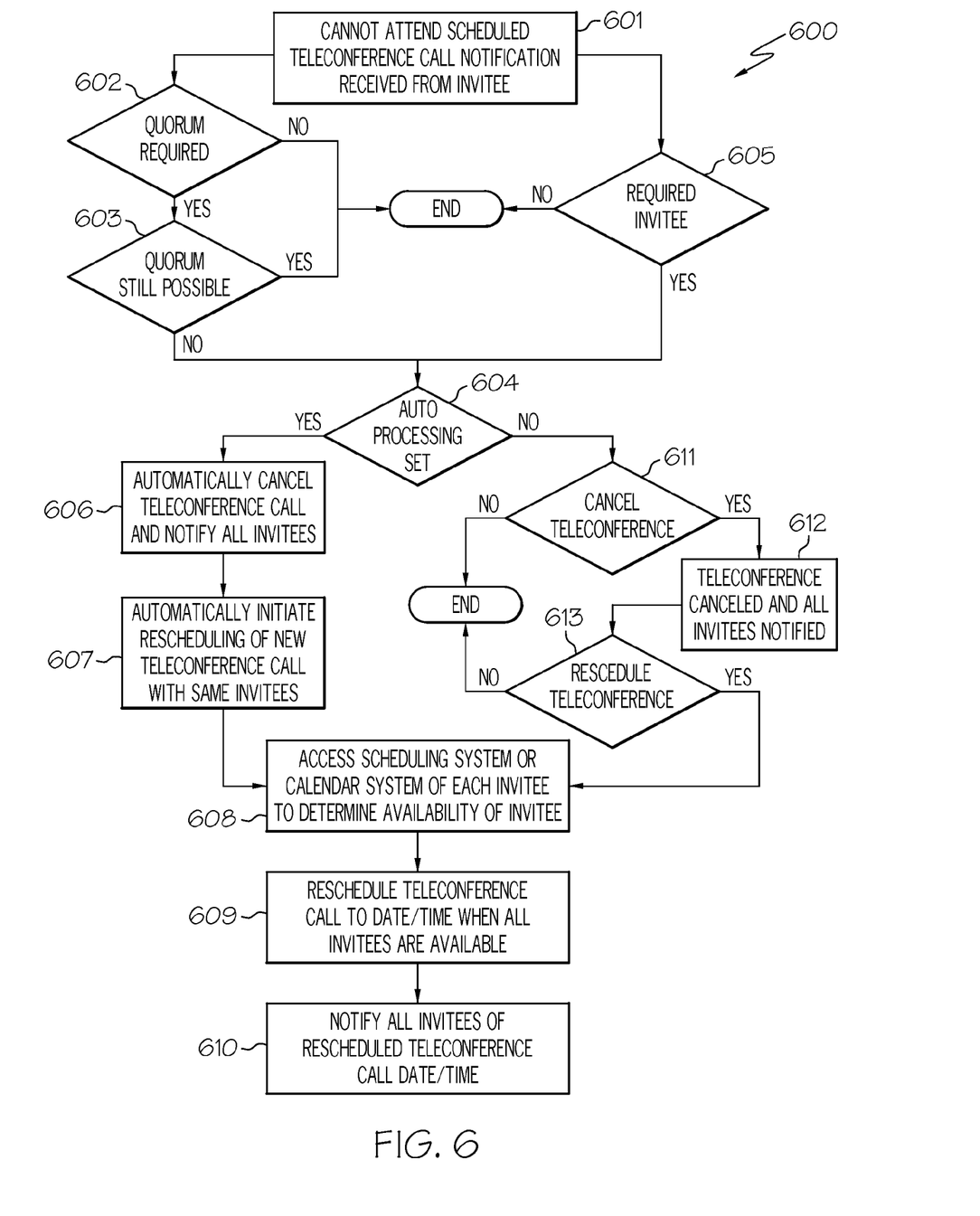
FIG. 6 is a flowchart of a process for rules-based teleconferencing before a teleconference has started according to an exemplary embodiment of the present invention.

FIG. 6 shows a flowchart of a process for rules-based teleconferencing before a teleconference has started according to an exemplary embodiment of the present invention. In the process 600, in block 601, before a scheduled teleconference call has started, a notification may be received from an invitee that the invitee cannot attend the scheduled teleconference call. In block 602, it may be determined whether a quorum for the teleconference call was required and if not, the process ends. If a quorum was required, then in block 603, it may be determined whether a quorum is still possible at the teleconference call and if so, the process ends. If a quorum is not possible because this invitee cannot attend, then in block 604, it may be determined whether automatic processing of the teleconference call has been set.

Simultaneously, after receipt of notification from an invitee that the invitee cannot attend the teleconference call, in block 605, it may be determined whether this invitee is a required invitee and if not, the process ends. If the invitee is a required invitee, then in block 604, it may be determined whether automatic processing of the teleconference call has been set.

If automatic processing has been set, then in block 606, the teleconference call may be automatically cancelled and all invitees may be notified of the cancellation. Then in block 607, rescheduling of a new teleconference call with the same invitees may be automatically initiated. In block 608, a scheduling system or calendar system of each invitee may be accessed to determine the availability of each invitee or the rescheduled teleconference call. In block 609, the teleconference call may be rescheduled to a date/time when all invitees are available and then in block 610, all invitees may be automatically notified of the rescheduled teleconference call date/time.

If automatic processing has not been set, then in block 611, it may be determined whether to cancel the current teleconference call. This may occur via sending a message or prompt to a chair or initiator of the teleconference call requesting their decision, or the chair or initiator of the teleconference call may cancel the teleconference call by making a selection or sending a message to a call system. If it is determined not to cancel the teleconference call, then the process ends. If it is determined to cancel the teleconference call then in block 612, the teleconference call may be canceled and all invitees notified of the cancellation. In block 613, it may be determined whether it is desired to reschedule the teleconference call and if not, the process ends. Again, a chair or initiator of the teleconference call may be sent a message or prompted to make a decision regarding rescheduling, or the initiator or chair of the teleconference call may send a message or make a selection with their decision regarding rescheduling the teleconference call. If it is determined to reschedule the teleconference call, then in block 608, a scheduling system or calendar system of each invitee may be accessed to determine the availability of each invitee or the rescheduled teleconference call. In block 609, the teleconference call may be rescheduled to a date/time when all invitees are available and then in block 610, all invitees may be automatically notified of the rescheduled teleconference call date/time.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for rules-based teleconferencing comprising:
receiving criteria regarding invitees to a teleconference call;
generating rules based on the criteria;
generating a notification regarding the invitees to the teleconference call based on the rules;
sending an audio message in the teleconference call to a teleconference chair or initiator to make a selection to cancel the teleconference in response to the criteria not being met;

sending another audio message in the teleconference call to the teleconference chair or initiator to make a selection to reschedule the teleconference in response to the teleconference chair or initiator making the selection to cancel the teleconference; and automatically accessing a scheduling system or a calendar system of each invitee to reschedule the teleconference in response to the teleconference chair or initiator making the selection to reschedule the teleconference.

2. The method according to claim 1, further comprising initiating a teleconference call and generating the notification regarding the invitees during the teleconference call to at least one invitee that has joined the teleconference call.

3. The method according to claim 1, further comprising generating the notification regarding the invitees to at least one invitee before initiating the teleconference call.

4. The method according to claim 1, wherein the criteria comprises a quorum of a minimum number of invitees that must be in attendance at the teleconference call.

5. The method according to claim 4, further comprising generating a notification when the quorum of the minimum number of invitees is in attendance at the teleconference call.

6. The method according to claim 4, further comprising generating a notification when the quorum of the minimum number of invitees is at least one of not in attendance at the teleconference call and will not be in attendance at the teleconference call.

7. The method according to claim 4, further comprising automatically canceling the teleconference call and rescheduling another teleconference call when the quorum of the minimum number of invitees is at least one of not in attendance at the teleconference call and will not be in attendance at the teleconference call.

8. The method according to claim 1, wherein the criteria comprises a list of specific invitees required to be in attendance at the teleconference call.

9. The method according to claim 8, further comprising generating a notification when all specific invitees on the list are in attendance at the teleconference call.

10. The method according to claim 8, further comprising generating a notification when all specific invitees on the list are at least one of not in attendance at the teleconference call and will not be in attendance at the teleconference call.

11. The method according to claim 8, further comprising automatically canceling the teleconference call and rescheduling another teleconference call when all invitees on the list are at least one of not in attendance at the teleconference call and will not be in attendance at the teleconference call.

12. The method according to claim 1, further comprising accessing at least one of the scheduling system and the calendar system of each invitee to schedule the teleconference call.

13. The method according to claim 1, further comprising one of modifying the rules and overriding the rules responsive to a request.

14. The method of claim 1, further comprising:
rescheduling the teleconference to a date and time when the invitees are available; and
sending a notification to each invitee of the rescheduled teleconference date and time.

15. A processing device comprising:
a network interface;
at least one second interface configured to establish a connection between at least three telephones; and
a controller configured to establish a teleconference call between the at least three telephones, receive criteria regarding invitees to the teleconference call, generate rules-based on the criteria, generate a notification regarding the invitees to the teleconference call based on the rules, send an audio message in the teleconference call to a teleconference chair or initiator to make a selection to cancel the teleconference in response to the criteria not being met, sending another audio message in the teleconference call to the teleconference chair or initiator to make a selection to reschedule the teleconference in response to the teleconference chair or initiator making the selection to cancel the teleconference, and automatically accessing a scheduling system or a calendar system of each invitee to reschedule the teleconference in response to the teleconference chair or initiator making the selection to reschedule the teleconference.

16. The processing device according to claim 15, wherein the processing device comprises a call system.

17. The processing device according to claim 15, wherein the at least one second interface comprises a private branch exchange (PBX) interface.

18. The processing device according to claim 15, wherein the at least one second interface comprises a public switched telephone network (PSTN) interface.

19. The processing device according to claim 15, wherein the at least one second interface comprises a wireless telephone network interface.

20. The processing device according to claim 15, wherein the at least one second interface comprises a Voice over Internet Protocol (VoIP) interface.

21. A computer program product comprising a computer useable storage medium, that is not a transitory propagating signal, the computer usable storage medium having computer useable program code embodied therewith, the computer useable program code comprising:
computer useable program code configured to receive criteria regarding invitees to a teleconference call;
computer useable program code configured to generate rules-based on the criteria;
computer useable program code configured to generate a notification regarding the invitees to the teleconference call based on the rules; and
computer useable program code configured to send an audio message in the teleconference call to a teleconference chair or initiator to make a selection to cancel the teleconference in response to the criteria not being met
computer useable program code configured to send another audio message in the teleconference call to the teleconference chair or initiator to make a selection to reschedule the teleconference in response to the teleconference chair or initiator making the selection to cancel the teleconference; and
computer useable program code configured to automatically access a scheduling system or a calendar system of each invitee to reschedule the teleconference in response to the teleconference chair or initiator making the selection to reschedule the teleconference.

* * * * *